(12) United States Patent
Pradt

(10) Patent No.: US 6,484,507 B1
(45) Date of Patent: *Nov. 26, 2002

(54) METHOD AND APPARATUS FOR CONTROLLING LIQUID DROPLET SIZE AND QUANTITY IN A STREAM OF GAS

(76) Inventor: Louis A. Pradt, P.O. Box 1703, Wausau, WI (US) 54402

( * ) Notice: Subject to any disclaimer, the term of this patent is extended or adjusted under 35 U.S.C. 154(b) by 0 days.

This patent is subject to a terminal disclaimer.

(21) Appl. No.: 09/873,693

(22) Filed: Jun. 5, 2001

(51) Int. Cl.[7] .................................................. F02C 3/30
(52) U.S. Cl. .......................................... 60/775; 60/39.53
(58) Field of Search ............................... 60/775, 39.53, 60/728, 39.092

(56) References Cited

U.S. PATENT DOCUMENTS

| | | | | |
|---|---|---|---|---|
| 5,125,226 A | * | 6/1992 | Sperinck | 60/39.092 |
| 5,386,873 A | * | 2/1995 | Harden | 165/47 |
| 5,979,507 A | * | 11/1999 | Kojima | 138/39 |

* cited by examiner

Primary Examiner—Ehud Gartenberg

(57) ABSTRACT

A process for creating and controlling the flow of a stream of liquid droplets of a predetermined maximum size in a stream of gas in which the liquid is first passed through a means to produce a fine spray, mist, or fog in the stream of gas and in which the subsequent stream of droplets and gas is treated in a device designed to remove larger droplets and allow the stream of gas containing the small droplets of a predetermined maximum size to pass to the inlet of a gas compressor.

5 Claims, 1 Drawing Sheet

Figure 1:
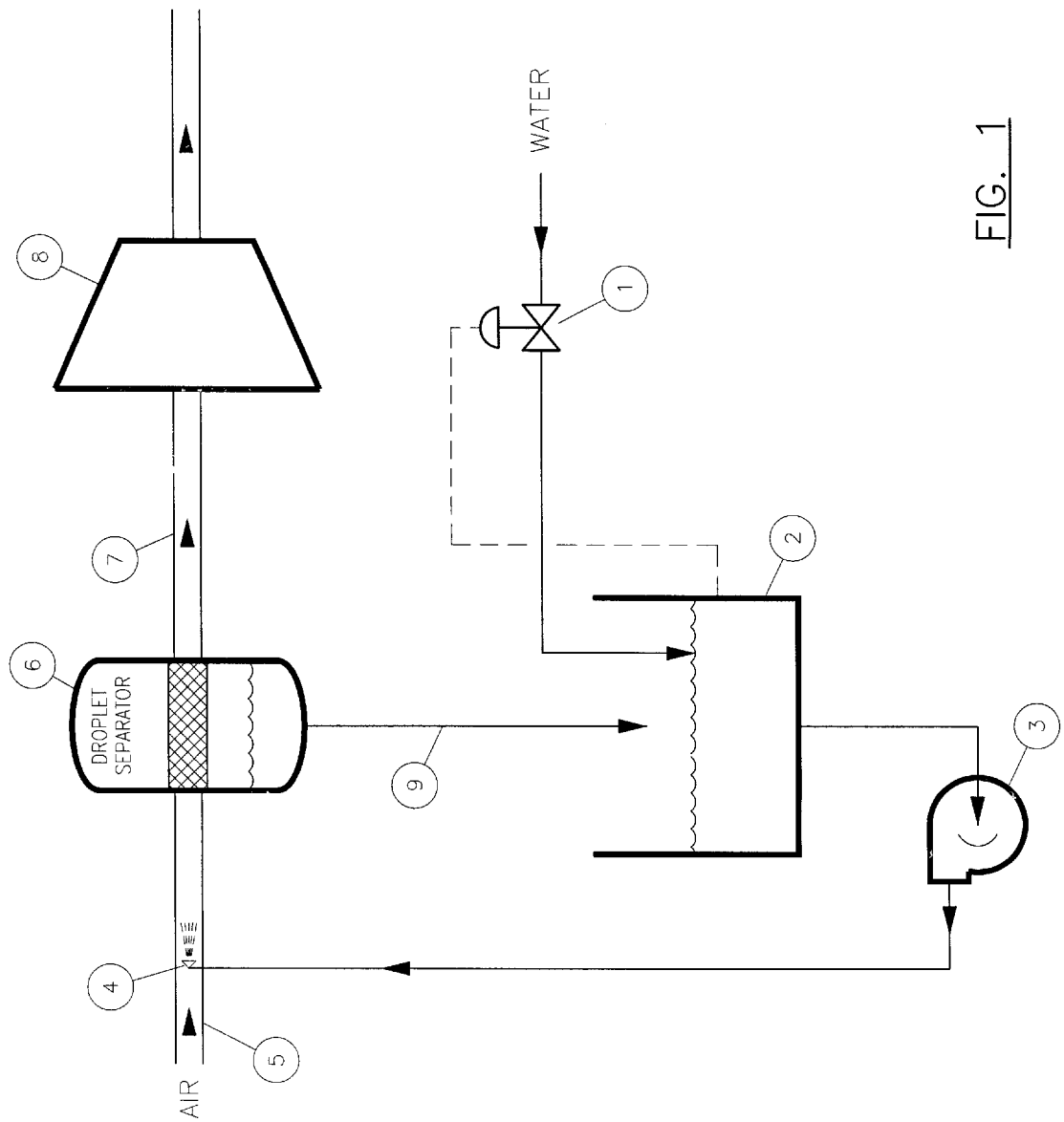

METHOD AND APPARATUS FOR CONTROLLING LIQUID DROPLET SIZE AND QUANTITY IN A STREAM OF GAS

BACKGROUND OF THE INVENTION

The term "wet compression" is used to describe compression of a gas wherein liquid in contact with the gas being compressed is evaporated by the heat of compression.

Evaporation of the liquid results in a lower temperature rise for the gas during compression than would occur without evaporation. This effect is also known as "adiabatic cooling", that is, reduction of temperature without removal of heat.

The lower temperature of the gas at the end of compression results in lower energy required for the compression. This provides an economic benefit in the form of lower power cost.

The term "isothermal compression", or compression at constant temperature, is a more general term for the idealized embodiment of this process and is used in the title of reference U.S. Pat. No. 4,478,553, above.

Wet compression can be applied to the compression of most gases in most kinds of compression equipment. However the greatest potential economic benefit and greatest savings in energy cost will be in the application of wet compression in gas turbines.

It is well established that the efficiency of a gas turbine can be improved by the use of wet compression as described in the Kleinschmidt reference, above.

Among the conclusions by Shao-Lee Soo in a publication in Other References, above, is the statement "Efficient wet compression requires water particles of size below 20 microns diameter. There is little or no danger of erosion of blades with particles of this order of magnitude." Droplets of this small size in a gas are often referred to as a mist or fog.

A mist or fog can be created by forcing liquid through a nozzle specifically designed for this purpose. Bete Fog Nozzle Inc. and Spraying Systems Co. are companies that manufacture such nozzles.

A problem for this requirement is that all nozzles produce a spray of droplets of varying sizes. If a nozzle is designed and operated so as to produce droplets of 20 microns in diameter some droplets will be 20 microns or less but there will be larger droplets as well. The larger droplets can cause erosion in the compressor and will not evaporate completely thus limiting the benefits of wet compression.

In the invention of U.S. Pat. No. 5,930,990 the nozzles specified as preferred are 1-7N-316SS12 from Spraying Systems Co. These nozzles do in fact produce a spray with droplets of varying size. According to data received from the manufacturer of these nozzles, Spraying Systems Co., the drop size under the conditions specified will vary from 7 microns to 501 microns. About 98% of the volume of droplets will be larger than 20 microns, and about half of the volume of droplets will be larger than 165 microns.

Thus in this preferred embodiment of U.S. Pat. No. 5,930,990 it is to be expected that wet compression will not be efficient, that is, larger water droplets will pass through without being evaporated and there will be the danger of erosion by the larger droplets.

Another problem in the application of wet compression is control of amount of water injected into the inlet air stream of the compressor. When starting wet compression water should be added in small increments of the total amount desired to avoid thermal stresses as pointed out in U.S. Pat. No. 5,930,990, a reference to this application.

If a fogging nozzle is operated at a liquid flow less than the design flow there will be a larger proportion of larger droplets and as the flow decreases there will be more larger droplets finally resulting in a discharge from the nozzle that is a solid stream of liquid with no droplets.

In the invention of U.S. Pat. No. 5,930,990 there is disclosed a spray rack group assembly in which there is a plurality of nozzles discharging into the inlet gas of the compressor. The patent discloses in claim 1 that liquid is added "in a plurality of nebulized water mass flow increments . . . ". The means of obtaining these increments is not shown or described but evidently water would be admitted independently to each spray rack pipe 303 in FIG. 4 of U.S. Pat. No. 5,930,990 by means of valves or by having a separate pump for each spray rack pipe. This would require a complicated system of valves and controls. In FIG. 4 there are shown five spray rack pipes meaning that there would be five increments available. Increments would have to be added in steps, not smoothly and continuously.

In the invention of reference U.S. Pat. No. 4,478,553 wet compression is conducted by introducing liquid, referred to as coolant, directly in to the gas flow through passages in the rotating elements of the compressor. The preferred embodiment of this invention uses a centrifugal compressor whereas most gas turbines use axial flow compressors. The invention can be applied to axial flow compressors but at greater complexity and expense. The specification does not disclose how the invention might be applied to an axial flow machine. Application of this invention to an existing machine would require a significant rebuilding of the machine.

SUMMARY OF THE INVENTION

It is therefore the object of this invention to provide means of creating droplets of liquid, carried in a moving stream of gas, in which the size of the droplets is controlled so as to be smaller than a given, predetermined size so that said stream of gas containing the liquid droplets can be utilized as the inlet flow of a gas compressor in which the droplets will not cause erosion and will evaporate completely in the gas compressor.

It is a further object of this invention to provide a means of controlling the flow of liquid droplets of a predetermined size smoothly and continuously from zero flow to the maximum flow desired for the application.

It is a further object of this invention to provide means of creating droplets of liquid, carried in a moving stream of gas, in which the size of the droplets is controlled so as to be smaller than a given, predetermined size so that said stream of gas containing the liquid droplets can be utilized as the inlet flow of any device in which said stream of gas an liquid can be usefully employed.

In the application of this invention this desired result is accomplished by first dispersing a liquid in a stream of gas by using known means such as fogging nozzles and then removing from the stream of gas droplets that are larger than desired for the particular application.

BRIEF DESCRIPTION OF THE DRAWING

FIG. 1 is a schematic representation of the preferred embodiment of this invention.

DETAILED DESCRIPTION OF THE INVENTION.

The preferred embodiment of this invention is shown in FIG. 1.

In FIG. 1, water is supplied to a control valve 1 which controls the level of water in holding tank 2. Pump 3 is a variable capacity device that raises the water to a desired pressure and flow rate. The pressurized water flows to nozzle 4 which is mounted internally in conduit 5.

5 is a pipe or other conduit in which air is flowing in the direction shown. 6 is a liquid-gas separation device. 7 is a pipe or conduit through which the water and air passes to gas compressor 8. 9 is a pipe or other conduit that conveys water removed by separator 6 back to holding tank 2.

In the application of this invention the amount of water per unit time and the size of the water droplets required by compressor 8 will first be determined. This determination is made by known means and is described in the references above.

The pump 3 and nozzle 4 will be selected so as to provide the required amount of water that is produced in droplets of a required maximum size and smaller in the air stream passing through conduit 5.

As stated above there will inevitably be water droplets in conduit 5 that are larger than the required maximum size. In the application of this invention the liquid-gas separation device 6 removes these oversized droplets. Those skilled in the art will understand that with a given nozzle 4 the higher the pressure of water conveyed to the nozzle the higher will be the percentage of smaller sized droplets. Likewise, a larger amount of water conveyed to nozzle 4 at a lower pressure will result in a larger number of total droplets but with a smaller percentage of smaller droplets. The economics of this trade-off can be evaluated by known means.

In the prior application of gas-liquid separation devices it is the objective to remove as much liquid as possible within physical and economic limits. If such a device is designed to remove droplets of a given size and larger, heretofore there is no consideration given to allowing droplets of a given size and smaller to pass through the device.

It is a unique and novel feature of the application of this invention that it is the objective of the gas-liquid separation device to allow droplets of a predetermined maximum size to pass through In the application of this invention the gas and liquid will exist in a liquid-in-gas system, that is, the gas is the continuous phase and the liquid is the discontinuous phase. Gas-liquid separators for this kind of system operate by utilizing centrifugal force, gravity, impingement, or electrostatic and acoustic forces. The latter two techniques are not applicable for this invention since they are usually applied when it is desired to remove very small droplets.

Thus in the preferred embodiment of this invention the gas-liquid separation device. will utilize centrifugal force, gravity, or any combination of these.

Those knowledgeable in the art of gas-liquid separation will understand that the efficiency of these devices as measured by the minimum size of droplets removed will depend upon the velocity of the gas, the holding time of gas and liquid, placement of surfaces, etc., which enable the device to remove droplets of a certain minimum size and allow droplets of a given maximum size to pass through.

Thus in the application of this invention, for a given flow of gas at 5, the amount and maximum droplet size of liquid at 7 in FIG. 1 can be obtained by the combination of selection of nozzle 4, the flow rate and pressure of liquid supplied to nozzle 4 and the design of gas-liquid separation device 6.

Referring again to the drawing of FIG. 1 it has been stated above that pump 3 is a variable capacity device. If the pump is operated at low flow the pressure drop across nozzle 4 will be low. There will be a flow rate at which there will be no droplets smaller than the predetermined size that will pass through liquid-gas separator 6. No water droplets will pass through to device 8. As the flow of liquid to nozzle 4 is increased there will be reached a point at which droplets small enough to pass through separator 6 are formed. Such droplets will pass through the separator 6 and on to device 8.

As the flow to nozzle 4 is increased the flow of droplets of the desired size will increase until the desired flow is reached.

In this manner the flow of droplets of the desired size can be varied smoothly and continuously from zero to the maximum flow required.

In the preferred embodiment of this invention, the embodiment that is believed to be the most useful in practice, the gas will be air and the liquid will be water and the resulting stream of air and water droplets will be conveyed to the compressor section of a gas turbine in order to effect adiabatic cooling in said compressor section of the gas turbine.

It is to be understood that in this preferred embodiment that the gas turbine can be an existing machine already in operation before this invention is applied. The gas turbine can also be a new machine designed and built to specifically incorporate this invention.

It is to be understood that the gas can be any other gas and the liquid any other liquid compatible with the end use of the stream of droplets in the gas.

For example, in applying this invention to the compression of a hydrocarbon gas such as natural gas, the liquid can be a hydrocarbon liquid with appropriate physical and chemical properties.

Those skilled in the art will understand that the process of this invention can be carried out by means other than shown in FIG. 1. For example, high-pressure water might be available at a power plant in the form of boiler feedwater that can be metered directly to nozzle 4. Water removed by separator 6 can be returned for reuse or discarded depending on the needs of the user.

It is believed that the most useful application of this invention will be to effect adiabatic cooling in compressors, particularly the compressor section of gas turbines. The product created by the application of this invention, a controlled amount of liquid droplets of a predetermined maximum size in a stream of gas, can also be beneficially used in other devices. For example, the device 8 in FIG. 1 could be a heater in which the droplets area to be evaporated or a reaction vessel in which the droplets react chemically with the gas. In either case small droplet size would be beneficial.

What is claimed is:

1. A process in which a liquid is sprayed through a nozzle into a stream of gas and in which the resulting stream of liquid droplets and gas is conveyed to a device which is designed to remove droplets larger than a predetermined size and to allow droplets of a predetermined maximum size to be carried along with the gas stream to comprise the inlet flow of gas compressor.

2. A process according to claim 1 in which the gas is air and the liquid is water and in which the resulting stream of air and water droplets are conveyed to an air compressor.

3. A process according to claim 2 in which the air compressor is the compressor section of a gas turbine.

4. A process according to claim 1 in which the gas and liquid are any compounds which are physically and chemically compatible and appropriate for comprising the inlet flow of a compressor having the objective of compressing the gas.

5. A process according to claim 1 in which the flow of liquid through the nozzle is varied so as to produce a greater or lesser amount of liquid droplets of a predetermined maximum size.

* * * * *